United States Patent
Langsdorf et al.

(10) Patent No.: US 7,107,792 B2
(45) Date of Patent: Sep. 19, 2006

(54) METHOD AND DEVICE FOR RETAINING AND TRANSPORTING FLAT GLASS IN A CONTACTLESS MANNER

(75) Inventors: Andreas Langsdorf, Ingelheim (DE); Ruediger Sprengard, Mainz (DE); Sybill Nuettgens, Frankfurt am Main (DE); Ulrich Lange, Mainz (DE)

(73) Assignee: Schott AG, Mainz (DE)

( * ) Notice: Subject to any disclaimer, the term of this patent is extended or adjusted under 35 U.S.C. 154(b) by 389 days.

(21) Appl. No.: 10/362,636

(22) PCT Filed: Sep. 8, 2001

(86) PCT No.: PCT/EP01/10379

§ 371 (c)(1), (2), (4) Date: Feb. 25, 2003

(87) PCT Pub. No.: WO02/22514

PCT Pub. Date: Mar. 21, 2002

(65) Prior Publication Data

US 2003/0177790 A1  Sep. 25, 2003

(30) Foreign Application Priority Data

Sep. 14, 2000  (DE) .............................. 100 45 479

(51) Int. Cl.
*C03B 40/02* (2006.01)
(52) U.S. Cl. .................. 65/25.2; 65/25.3; 65/25.4; 65/29.15; 65/33.1; 65/161; 65/162; 65/182.2
(58) Field of Classification Search .................. 65/25.2, 65/25.3, 25.4, 29.13, 29.15, 33.1, 33.9, 161, 65/162, 182.2, 273
See application file for complete search history.

(56) References Cited

U.S. PATENT DOCUMENTS

| | | | | |
|---|---|---|---|---|
| 2,678,237 A | * | 5/1954 | Allander et al. | ............... 406/88 |
| 3,150,948 A | * | 9/1964 | Gladieux et al. | ............ 65/25.2 |
| 3,223,501 A | * | 12/1965 | Fredley et al. | ................ 65/25.2 |
| 3,607,198 A | | 9/1971 | Meunier | |
| 3,665,730 A | | 5/1972 | Linzer | |
| 3,809,542 A | * | 5/1974 | Lythgoe et al. | ............... 65/33.2 |
| 4,046,543 A | * | 9/1977 | Shields | ........................ 65/25.2 |
| 4,204,845 A | * | 5/1980 | Shields et al. | ................ 65/25.2 |
| 5,078,775 A | | 1/1992 | Maltby | |
| 5,403,369 A | * | 4/1995 | McMaster | .................... 65/25.4 |
| 2003/0037573 A1 | * | 2/2003 | Langsdorf et al. | ............ 65/158 |

FOREIGN PATENT DOCUMENTS

| DE | 1 756 070 | 4/1970 |
|---|---|---|
| DE | 27 22 732 | 11/1978 |
| DE | 298 17 177 U | 12/1998 |
| DE | 299 02 433 U | 5/1999 |
| EP | 0 010 854 A | 5/1980 |
| EP | 0 578 542 A | 1/1994 |
| GB | 1 383 202 | 2/1975 |

* cited by examiner

*Primary Examiner*—Sean Vincent
(74) *Attorney, Agent, or Firm*—Michael J. Striker

(57) ABSTRACT

The method of supporting and transporting hot flat glass on a gas bed for ceramicizing includes arranging a number of spaced-apart porous or perforated planar segments to form a base with a gas-permeable support surface so that slits, which are narrower than the planar segments, are formed between them, forcing gas through the porous or perforated planar segments and conducting the gas away through the slits between them so as to form the gas bed with no static pressure zones and with a parabolic pressure distribution and producing a predetermined temperature profile for ceramicizing through which the hot flat glass is transported on the gas bed without deformation and without any contact between it and the base. The resulting glass ceramic has smoother surfaces without pits or deformations.

24 Claims, 3 Drawing Sheets

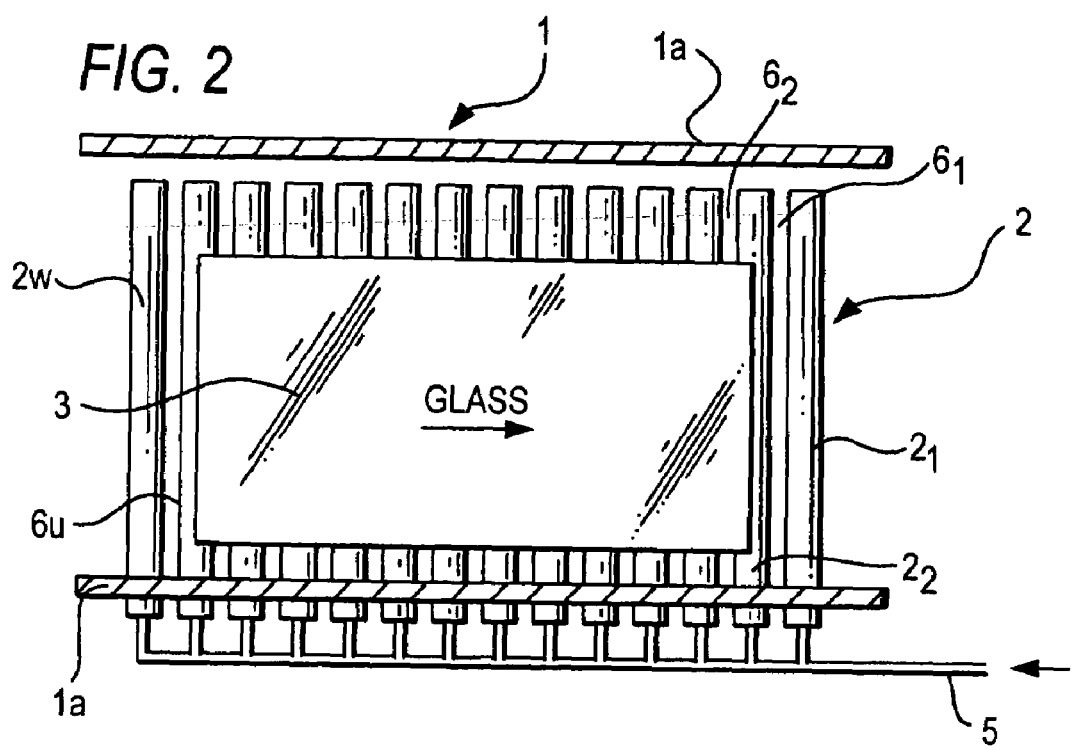
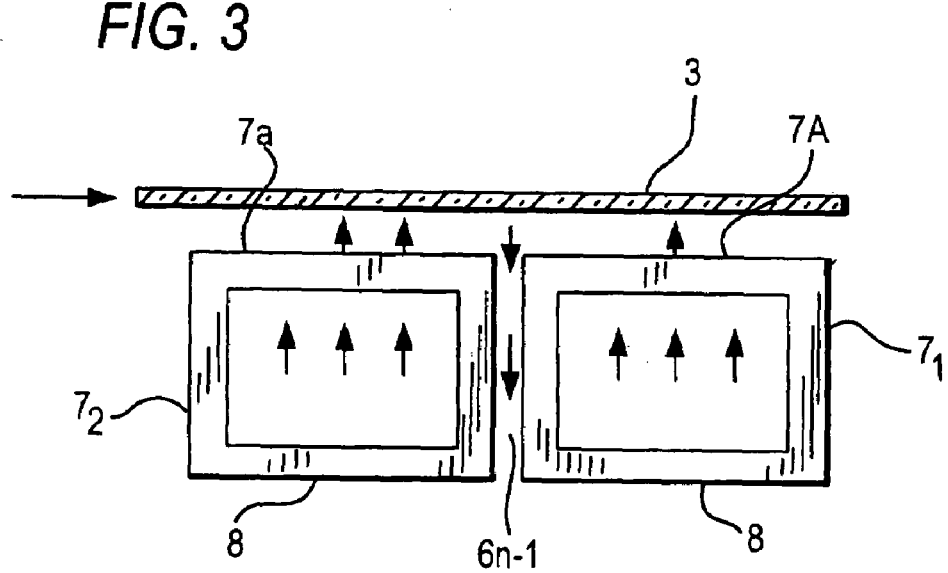

METHOD AND DEVICE FOR RETAINING AND TRANSPORTING FLAT GLASS IN A CONTACTLESS MANNER

BACKGROUND OF THE INVENTION

1. The Field of the Invention

The invention relates to a method for supporting and transporting hot flat glass on a gas bed, which is built up over a gas-permeable support surface of a base, in a contactless manner by passing a gas through the support surface.

The invention also relates to a device for performing this method.

2. Related Art

In the conventional glass ceramicizing process typically used in the industry, the glass to be ceramicized, typically in the form of a plate-shaped or flat green glass body, rests on a solid base. Since during the ceramicization process temperatures and viscosities are reached at which the glass surface can be harmed by mechanical contact with the base, spot-shaped impressions due to adhesion known as "pits" appear on the underside of the glass. Due to shrinkage occurring during ceramicization, relative motion between the supported glass and the base also occurs, creating scratches on the glass surface.

These disadvantages, which result from contact of the green glass plate with the solid base, seemingly suggest employing principles from float glass production. However, the ceramicization process differs from the usual float glass tempering process in that substantially higher temperatures are required, usually up to about 950° C., but in special cases even up to 1250° C., instead of about 500° C. to 700° C. in the case of tempering and bending furnaces for float glass. In addition, temperature homogeneity in the range of a few degrees K must be guaranteed to prevent deformations of the glass ceramic.

It is known to ceramicize glass in contactless fashion by retaining the green glass molded body to be ceramicized on a gas bed in which the supporting gas, as a rule air, flows out of a permeable base and builds up a load-bearing air bed between this base and the green glass molded body. Since there is no direct contact between a solid base and the green glass body, the aforementioned disadvantages cannot arise.

British Patent 1,383,202 discloses a corresponding device for contactless ceramicizing of a green glass plate on an air bed. However this known device has various disadvantages, because air is only supplied through perforated plates but is not drawn off through the base. With typical perforations in the plates, a comparatively high permeability is achieved.

Calculations show that in the middle region of the green glass plate to be ceramicized the gas speed is nearly zero and a "static" pressure is generated. Then a gas flow from the gas bed occurs essentially only in the vicinity of the edge of the plate. In contrast to the pressure in the edge region, the static pressure in the middle of the plate does not change in response to changes in the thickness of the gas film. Accordingly, in the plate center there are no restoring forces responding to deviations from planarity or from a particularly desired shape. Furthermore the thickness of the gas film is very sensitively dependent on the magnitude of the pilot pressure and other process parameters. Disruptions in these latter parameters can therefore cause warping of the plates.

U.S. Pat. No. 3,607,198 describes a device for contactless retention and transport of a hot glass plate on an air cushion that is built up above a solid base. Here, by arranging inlet-air slits and outlet-air slits successively alternating along the transport route zones with static and dynamic gas pressure are created, each extending over the entire width of the glass plate. Since here the gas delivery is effected via narrow slits with large interstices between them, the result is a gas supply that is locally very inhomogeneous, which in turn—because of the alternation between zones of high and low gas speed—makes it difficult to obtain a homogeneous temperature profile in the glass. Moreover, an expensive structure is employed, which is not suitable for use in the range of temperatures around 950° C., and certainly not for higher temperatures of up to about 1250° C. which can be necessary for ceramicization, because of considerations regarding the materials that are used.

U.S. Pat. No. 5,078,775 also discloses a device for contactless support and transport of a flat glass plate, in the tempering of float glass, on an air cushion that is built up above a solid base that likewise has alternating inlet-air and outlet-air slits. This known device, despite modifications in details, relies on the fundamental concept of U.S. Pat. No. 3,607,198, with the inlet-air and outlet-air slits in the base, and thus with regard to ceramicization applications has comparable disadvantages.

SUMMARY OF THE INVENTION

It is an object of the present invention to provide a method of the type described above for supporting and transporting hot flat glass, in which any contact whatever between the hot flat glass and the base is avoided by means of a gas bed for supporting the flat glass, so that a glass ceramic of a comparatively high smoothness can be produced when the method is employed during ceramicizing the flat glass.

It is another object of the present invention to provide a method of the type described above for supporting and transporting flat glass, in which any contact whatever between the flat glass and the base is avoided by means of a gas bed for supporting the flat glass and in which the transporting can be done optionally through a path in the furnace with a predetermined temperature profile for ceramicizing at temperatures up to 950° C. and higher while achieving temperature uniformity, so that a glass ceramic having smoother surfaces than those of the prior art is produced.

It is also an object of the present invention to provide a device for performing the method for contactless storing and transporting of the flat glass, preferably during ceramicizing, according to the present invention.

These objects and others, which will be made more readily apparent hereinafter, are attained in a method for contactless support and transport of hot flat glass on a gas bed, which is formed above a gas-permeable support surface of a base, as described above.

According to the present invention these objects are attained when the gas is forced through spaced-apart porous and/or perforated planar segments that form the support surface and gas is carried away through interstices between the planar segments in order to attain a uniform sheet-wise delivery of gas to the gas bed.

These objects and others, which will be made more readily apparent hereinafter, are attained in a device for contactless support and transport of hot flat glass, which comprises a gas-permeable base, disposed in a furnace, and a source of pressurized gas connected to the gas-permeable base to supply the gas to the base in order to build up a gas bed between the flat glass and a support surface of the base.

According to the present invention these objects are attained when the base comprises a plurality of spaced-apart planar segments, which together form the support surface, which are each porous or perforated and between which outlet-air openings for drawing or removing gas from the gas bed are provided.

By carrying the gas away from the gas bed between the planar porous and/or perforated segments of the support surface, a gas film forms between the support surface and the supported glass, with a pressure distribution that is parabolic and that has no static pressure zones. Via the interstices between the segments, the gas can readily flow out, so that no backup of gas occurs in the middle of the glass that would otherwise cause deformation of the flat glass.

In one embodiment of the invention, compressed air is used as the gas. This feature simplifies the method, since suitable compressed air equipment is readily available.

An advantageous contactless support and transport of the hot flat glass is possible in embodiments of the method, in which the supported glass at least intermittently has a viscosity of $<10^{13}$ dPas, corresponding to the so-called upper cooling point. For the so-called lower cooling point, the viscosity is $<10^{14.5}$ dPas.

To obtain flat glass with predetermined properties, in one embodiment of the method, a predetermined rising and/or falling temperature profile is traversed.

Advantageously, a temperature profile is traversed by which the glass on the gas bed is ceramicized. In this way, it is possible with relatively simple means to produce a glass ceramic plate by transporting a green glass plate through a ceramicizing furnace on a gas bed according to the method of the present invention without contacting the supporting surface over which the gas bed is built up so that the glass ceramic plate does not have scratches or pits on its underside.

In a preferred embodiment of the method the green glass is moved over the gas bed during ceramicization. As a result, the method can compensate for temperature differences in the furnace.

Preheated gas is used in one embodiment of the invention to maintain the temperature homogeneity required for the ceramicization. The preheating of the gas takes place at least predominantly when the gas flows through the porous and/or perforated planar segments so that temperature uniformity required for ceramicization can be largely maintained.

An advantageous embodiment of the method is obtained if the gas pressure in the individual segments is adjusted or regulated chronologically independently of one another. By creating a pressure gradient along the direction of motion of the glass, for instance, the flat glass can be moved over the base without contacting it.

In the method of the invention, either a glass ribbon or individual plates can be ceramicized. It is not absolutely necessary for the underside of the glass ribbon or of the plates to be smooth. It is also conceivable that the underside and optionally the top of the glass to be ceramicized has a structured surface, for instance studded. Also the underside in particular can be decorated.

With the provisions of the invention, a gas bed with a float height of between 30 μm and 1–3 mm can be created, which is sufficient for contactless storing and transporting of flat glass. Preferably, the range is between 50 μm and 1–3 mm.

In one embodiment of the device, the device is embodied such that the segments extend over the entire width of the flat glass to be treated. Uniform support of the flat glass is thus possible.

An especially simple embodiment of the device is obtained if the outlet-air openings are embodied as slits between the segments.

A preferred embodiment of the device is obtained if the individual segments are embodied as beams that have a box shape, into whose interior the gas delivery is effected, and of which at least one wall, forming the support surface, is embodied as porous and/or perforated. This embodiment makes an especially simple embodiment of the segments and outlet-air openings between the beams possible.

The beams can be realized by various kinds of molded bodies. A particular embodiment is obtained if the beams are each formed by a box-shaped porous ceramic body. Such ceramic bodies are commercially available for the very high temperatures, which are required in ceramicization.

In order to have an especially strong flow along the support surface, the ceramic body, with the exception of the wall forming the support surface, is encased or jacketed with a gas-impermeable material. For instance, the ceramic body can have a suitable coating or be sheathed with a metal foil.

The device is preferably embodied such that the segments are extended into a cold region through openings in the lateral furnace walls, so that the connections for the compressed air can be ducted through to the segments without thermal stress.

An especially effective gas bed is obtained if the porous and/or perforated support surface of the segments from which the gas flows out amounts to at least 30% of the total area of the base.

The mode of operation of the device is highly effective if a closed gas circulation is provided, in which the gas removed through the outlet-air openings is returned to the gas source again.

In one embodiment of the invention, a design of the base that is mirror-symmetrical relative to the center face of the glass is provided, as a result of which the top and underside can be kept under exactly the same thermal conditions.

Besides the possibility already mentioned of moving the flat glass along a pressure gradient in the gas bed above the segments, forward motion of the glass can be achieved by mechanical devices that contact it, such as rollers and slides.

To avoid such mechanical devices that employ contact and that always require their own drive mechanism, in a further embodiment of the invention the device is embodied such that the base with the gas bed is inclined downward in the direction of motion of the flat glass. As a result, the flat glass slides on its own to the lower location by gravity.

BRIEF DESCRIPTION OF THE DRAWING

The invention will be described in further detail in terms of an exemplary embodiment shown in the drawings, in which

FIG. 2 is a schematic top plan view of a base comprising spaced-apart separate planar segments, which each have a porous and/or perforated support surface, through which gas is supplied to the gas bed and between which outlet-air openings for removing the gas from the gas bed are formed;

FIG. 3 is a schematic cutaway cross-sectional view through an embodiment of separate planar segments formed by box-shaped ceramic bodies having a gas impermeable jacket, except for a gas-permeable top surface;

DETAILED DESCRIPTION OF THE INVENTION

Figure 1:
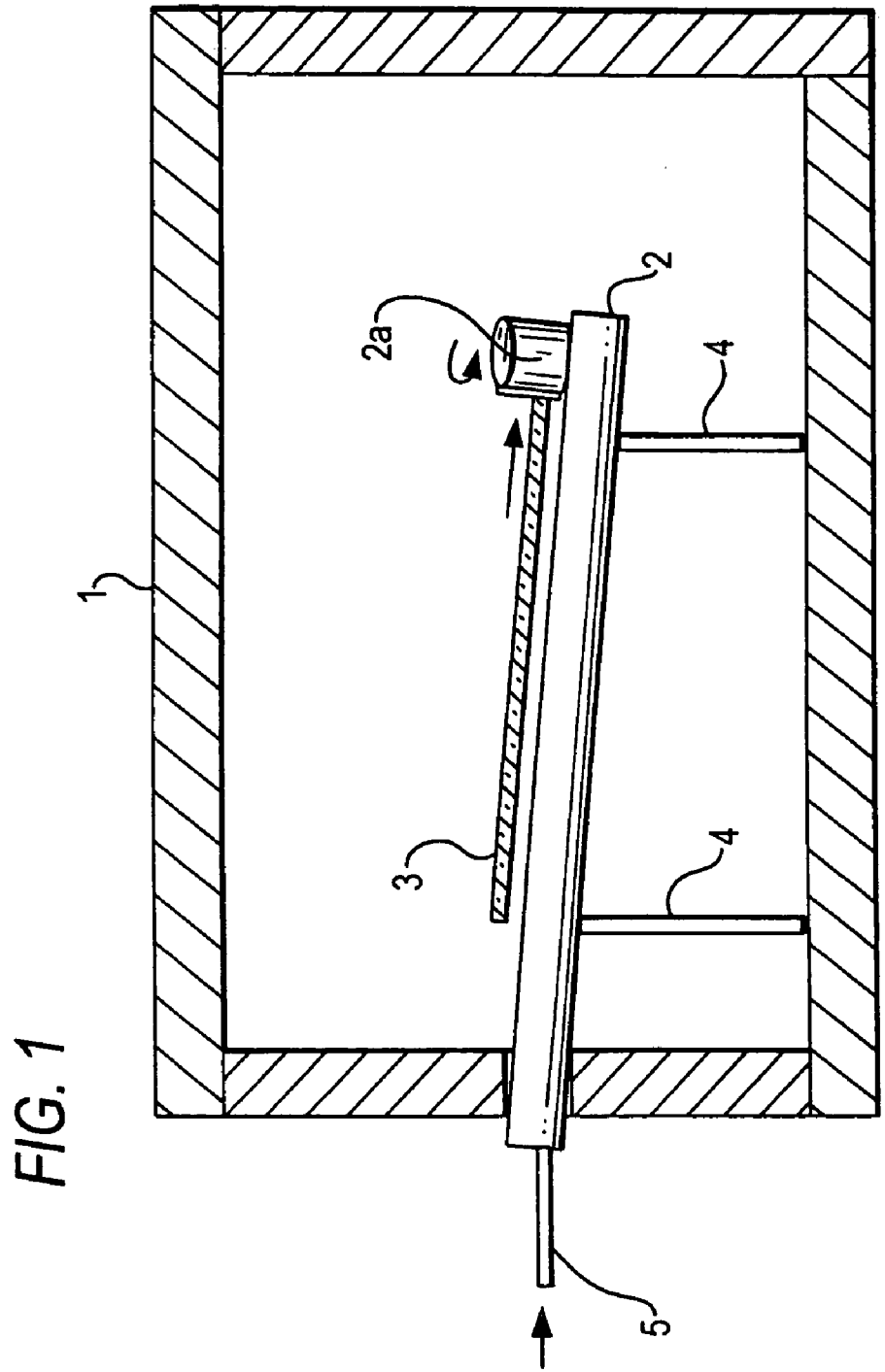
FIG. 1 is a schematic longitudinal cross-sectional view through a furnace chamber, in which a base is set up for supporting a flat glass pane in contactless fashion by means of a gas bed produced above it.

FIG. 1, in a schematic view, shows a ceramicization furnace 1, in which a base 2, embodied according to the invention and comprising the beam system to be explained later, for retaining the green glass plate 3 to be ceramicized is mounted on supports 4. One source 5 for the delivery of a suitable gas, preferably air, is connected to the base 2. This creates a gas bed, that is, an air cushion below the green glass plate 3, so that there will be no troublesome mechanical contact between the underside of the green glass plate 3 and the base 2. Because of the inclination of the base in this embodiment due to the supports 4, the green glass plate 3 slides automatically in the direction of the arrow during the ceramicization process, toward a mechanical transporting device, such as a roller 2a, which feeds the green glass plate perpendicular to the plane of the paper.

FIGS. 2 and 3 show the base 2, embodied according to the invention, for the green glass plate 3. Specifically, FIG. 2 shows this in a plan view, and FIG. 3, in a cross-sectional view. The base 2 comprises a plurality of segments $2_1$, $2_2$, ..., $2_n$, to which the source 5 of gas and in particular air is connected, and which have as homogenous an air outflow sheetwise as possible, which can be achieved by way of porous surfaces or surfaces with small perforations. The interstice $6_1$, $6_2$, ..., $6_n$ between these segments, which as a rule is embodied as a slit, serves to remove the outlet air, which is represented by a downward-pointing arrow in FIG. 3.

As FIG. 2 shows, these segments and interstices extend over the full width of the furnace, bounded by the side walls 1a.

In the exemplary embodiment shown in FIG. 3, the air-permeable planar segments each comprise upper box wall 7a of a box-shaped beam 7, which is formed by a porous material and/or has small openings, namely perforations.

Figure 4:
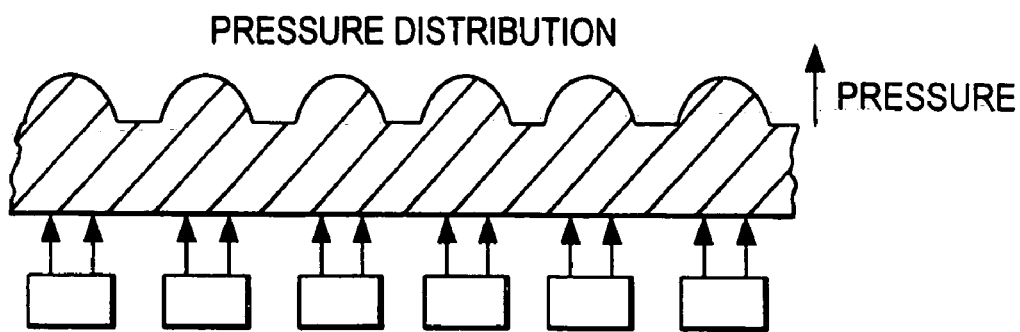
FIG. 4 is a graphical illustration showing the pressure distribution in a longitudinal direction within the gas bed.

In the interior of these beams $7_1$, $7_2$, ..., $7_n$, which are gas-permeable at the top, an overpressure of a suitable gas, such as air, is created by connecting the interior of each beam to a suitable pressure source. By means of the outflow of gas from the upper box wall 7a, which is strengthened by the gas-impermeable sheathing 8 on the other walls, a gas film develops between the top box wall 7a of the beam and the supported glass 3. When porous material is used, the pressure distribution is parabolic, as shown in FIG. 4, and has no static pressure zones. The gas can flow out into the interstices $6_1$, $6_2$, ..., $6_n$ between the beams $7_1$, $7_2$, ..., $7_n$, so that there is no backup of gas in the middle of the glass.

A number of advantages are attained by means of the invention.

First, a homogeneous, planar gas delivery is made possible, without creating zones of static pressure. This is advantageous, both for stabilizing the layer thickness of the green glass plate and for temperature homogeneity. In the case of porous gas exit faces, the gas temperature is made additionally more homogenous as a result of the heat-exchanger effect of the porous structure.

Moreover, through the interstices between the segments, a removal of gas is assured even in the central regions of the supported plates; as a result, arching and the development of zones of static pressure are avoided.

The preferred embodiment, which has spaced-apart beams that are perforated and/or porous at least on the top and interstices between the beams, has the advantage of a very simple construction, particularly taking into account the requisite temperatures of up to 950° C. and higher.

Figure 5:
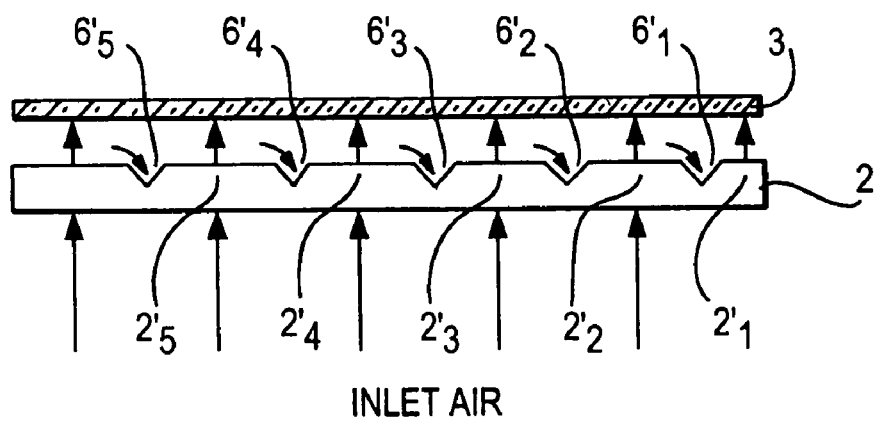
FIG. 5 is a schematic cutaway cross-sectional view through another embodiment of the gas-permeable base with connected porous planar segments.

In FIG. 5, a second embodiment of the invention is shown, with a base 2' of porous material that is structured in beam-like fashion. By means of passages in the base, porous segments $2'_1$, $2'_2$, $2'_3$, $2'_4$, $2'_5$, ..., $2'_n$ and outlet-air openings $6'_1$, $6'_2$, ..., $6'_n$ are predetermined. The load-bearing inlet air, that is, the gas, flows through the segments, while conversely the gas is carried away via the outlet-air openings.

In the exemplary embodiments, for a preferred material, the porosity is approximately 15%.

The diameter of alternative perforation openings is on the order of 0.5 to 1 mm.

The invention claimed is:

1. A method for supporting and transporting hot flat glass on a gas bed, said hot flat glass comprising green glass to be ceramicized, said method comprising the steps of:
   a) arranging a plurality of spaced-apart gas-permeable planar segments next to each other to form a base with a gas-permeable support surface so that slits are formed between the planar segments, and each of said planar segments is porous or perforated; and
   b) forcing gas through said gas-permeable planar segments and conducting the gas away through the slits between said planar segments, so that a uniform supply of the gas is provided to form the gas bed without static pressure zones under the hot flat glass during transport of the flat glass on the gas bed; and
   c) producing a predetermined temperature profile for ceramicizing through which the hot flat glass is transported on the gas bed in order to ceramicize the hot flat glass without any contact between the hot flat glass and the base and without deformation of the hot flat glass.

2. The method as defined in claim 1, wherein said gas is compressed air.

3. The method as defined in claim 1, wherein said hot flat glass supported on said gas bed at least intermittently has a viscosity of $\leq 10^{13}$ dPas, corresponding to the upper cooling point.

4. The method as defined in claim 1, wherein said hot flat glass supported on said gas bed at least intermittently has a viscosity of $\leq 10^{14.5}$ dPas, corresponding to the lower cooling point.

5. The method as defined in claim 1, in which the hot flat glass, at least on its underside, has a surface structure.

6. The method as defined in claim 5, wherein said surface structure comprises at least one of studs and a decoration.

7. The method as defined in claim 1, wherein said support surface is inclined so that the hot flat glass automatically slides in a transport direction through said temperature profile during ceramicization.

8. The method as defined in claim 1, further comprising preheating the gas to maintain temperature homogeneity required for ceramicization.

9. The method as defined in claim 8, wherein the preheating of the gas occurs at least predominantly during passage of the gas through the gas-permeable planar segments to help achieve the temperature homogeneity required for ceramicization.

10. The method as defined in claim 1, further comprising adjusting or regulating respective gas pressures of said gas in the gas-permeable planar segments chronologically independently of one another to maintain said gas bed without said static pressure zones and with a parabolic pressure distribution.

11. The method as defined in claim 10, wherein said adjusting or regulating of said respective gas pressures is such that a pressure gradient is created in a transport direction of the hot flat glass during ceramicization.

12. The method as defined in claim 1, in which the gas bed has a float height of from 30 μm and 1 mm.

13. The method as defined in claim 12, wherein said float height is from 30 μm and 3 mm.

14. A device for supporting and transporting hot flat glass on a gas bed, said hot flat glass comprising green glass to be ceramicized, wherein said device comprises a furnace for generating a predetermined temperature profile for ceramicizing through which the hot flat glass is transported on the gas bed;

a gas-permeable base, disposed in said furnace, said gas-permeable base comprising a plurality of spaced-apart planar segments arranged next to each other to form a gas-permeable support surface with respective slits between neighboring planar segments, and each of said planar segments is porous or perforated; and means for delivering gas under pressure to force said gas through porous or perforated support surfaces of said gas-permeable planar segments and to conduct the gas away through said slits, so that the gas bed is formed with no static pressure zones under the hot flat glass during transport of the flat glass on the gas bed.

15. The device as defined in claim 14, wherein said spaced-apart planar segments each extend over an entire width of the flat glass to be supported and transported.

16. The device as defined in claim 14, wherein the spaced-apart planar segments are separately formed bodies.

17. The device as defined in claim 16, wherein said spaced-apart planar segments are embodied as respective beams, each of said beams is box-shaped and provided with an interior space, said gas is delivered into said interior space of each of said beams, and each of said beams has a wall, which provides a part of the porous or perforated support surfaces.

18. The device as defined in claim 17, wherein each of said beams is a porous ceramic body that has the shape of a parallelepiped.

19. The device as defined in claim 18, wherein the porous ceramic body, with the exception of the wall, is encased or jacketed with a gas-impermeable material.

20. The device as defined in claim 14, further comprising a porous molded body segmented to form said spaced-apart planar segments that are porous and connected with each other, and wherein said porous molded body is provided with said slits between said segments in a top surface thereof.

21. The device as defined in claim 14, wherein the furnace has a lateral furnace wall and the spaced-apart planar segments extend into a cold region through an opening in the lateral furnace wall.

22. The device as defined in claim 14, wherein said gas flows out of an area on the support surfaces equal to at least 30% of a total area of the base.

23. The device as defined in claim 14, further comprising means for gas circulation so that the gas conducted away through the slits is returned again to the means for delivering the gas.

24. The device as defined in claim 14, further comprising a transport device for feeding the hot flat glass in a transport direction, and wherein the base is inclined obliquely downward, perpendicular to the transport direction of the hot flat glass and the transport device is arranged at a low point on the base.

* * * * *